United States Patent [19]

Peters

[11] 4,268,198
[45] May 19, 1981

[54] INDEXABLE INSERT DRILL
[75] Inventor: Robert W. Peters, Saegertown, Pa.
[73] Assignee: Greenleaf Corporation, Saegertown, Pa.
[21] Appl. No.: 23,707
[22] Filed: Mar. 26, 1979
[51] Int. Cl.³ ............................................. B23B 51/00
[52] U.S. Cl. .................................. 408/186; 408/705; 408/713
[58] Field of Search ................ 407/705, 713, 188, 186
[56] References Cited
U.S. PATENT DOCUMENTS 3,540,323  11/1970  Rishel .................................. 408/188
3,816,018  6/1974   Hlocky ................................ 408/713
3,963,365  6/1976   Shallenberger, Jr. .............. 408/186
4,124,328  11/1978  Hopkins .............................. 408/705
4,149,821  4/1979   Faber .................................. 408/705

Primary Examiner—Harrison L. Hinson
Attorney, Agent, or Firm—Ralph Hammar

[57] ABSTRACT

A drill having at least two indexable radially spaced inserts arranged with axially projecting cutting points to machine overlapping concentric grooves, the outermost insert machining a groove having an outside diameter equal to the diameter of the hole and the innermost insert machining a groove overlapping the center of the hole, and radial components of the cutting thrust on said inserts being in opposition and balancing each other. The cutting thrust may be balanced by the number, shape and/or the rake of the cutting edges.

6 Claims, 10 Drawing Figures

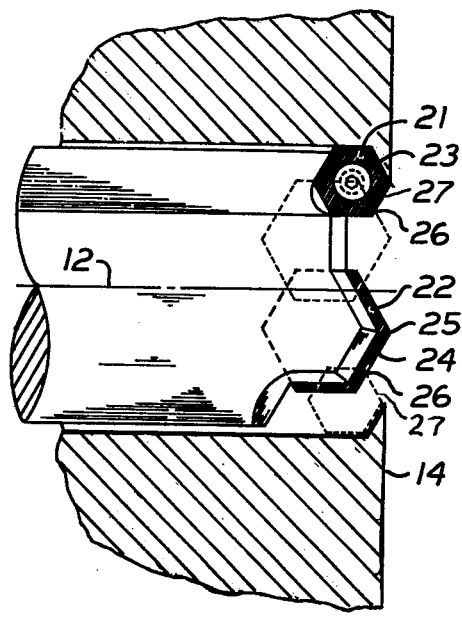

INDEXABLE INSERT DRILL

This invention is an indexable insert cutter head for drilling holes in solid stock without first drilling a pilot hole. By taking advantage of the greater cutting speeds of carbide and like materials, the output is greatly increased and the costs are lowered. Wandering of the cutter is prevented by designing the inserts to have equal and opposite radial cutting thrusts. Cutting thrust on the individual inserts may be increased by making the axial rake more negative and decreased by making the axial rake more positive. The cutting thrust may also be varied by changes in the shape, length, or number of the cutting edges.

Figure 2:
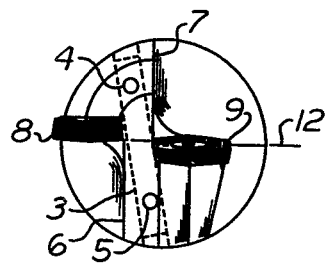
FIG. 2 is an end view.

FIGS. 7, 8, 9, and 10 are diagrammatic views of expedients for balancing the cutting thrust.

In the drawing, the numeral 1 indicates the shank of the drill, the numerals 2, 3, 4, 5 indicate passages for cooling liquid and the numerals 6, 7 indicate longitudinally extending flutes for the chip removal. The foregoing parts are, or may be, of common construction.

Figure 6:
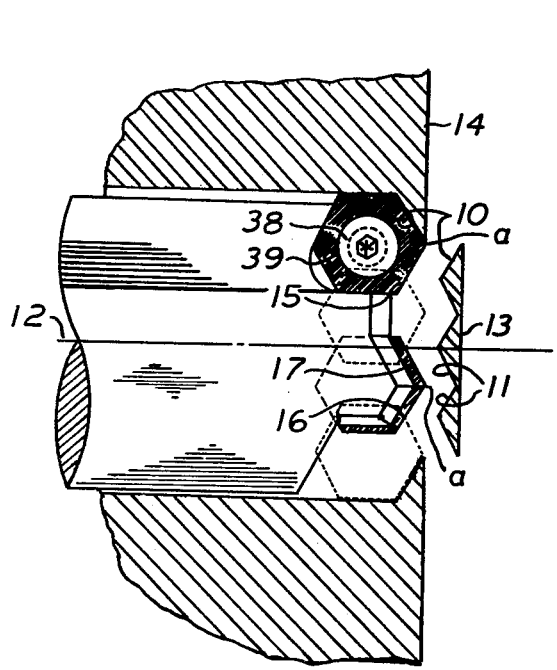
FIG. 6 is a section through a hole at the instant of breakthrough.

The cutting head may contain two or more cutting inserts 8, 9 of carbide material. In a preferred form, these inserts are of externally hexagonal shape and have identical cutting points a, b, c spaced 120° apart, any one of which may be indexed to active cutting position. The active cutting point a of insert 8 machines an annular groove 10 (FIG. 6). The active cutting point a of insert 9 machines an annular groove 11. The grooves 10, 11 are concentric with each other and are centered on the center line 12 of the shank.

Figure 1:
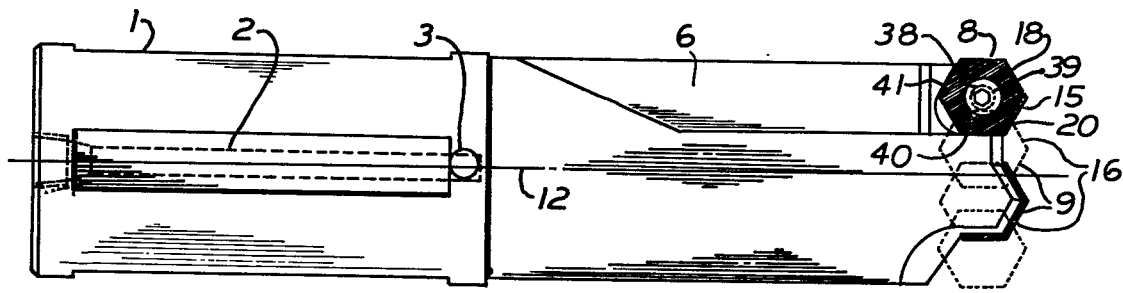
FIG. 1 is a side elevation of a preferred form of cutter head.

As is apparent from FIG. 6, which shows the cutter at the instant of breakthrough when a slug 13 is removed from the work piece 14, the edge 17 of active point a of insert 9 cuts past the center line 12 of the shank. The cutting edge 16 of the insert 9 also overlaps the cut made by the cutting edge 15 of the insert 8. The overlapping cuts made by the inserts 8 and 9 is also shown in FIG. 1 where the insert 9 is rotated 180° and shown in dotted lines overlapping the cutting edges 15 of the insert 8. FIG. 10 amplifies the FIG. 1 by showing the overlapping cuts of both inserts 8 and 9. All of the cutting edges except the outer cutting edge 18 of insert 18 have some overlap with the cutting edge of the next adjacent insert. The overlapping portions of the cutting edges are subject to cutting thrusts which balance each other. The non overlapping portions of the cutting edges are subject to cutting forces which are proportional to the amount of material removed. In FIG. 10, the length of cutting edge 18 plus the length of the non overlapping portion of cutting edge 17 is equal to the length of the non overlapping portion of cutting edge 16 plus the length of the non overlapping portion of cutting edge 15.

Figure 3:
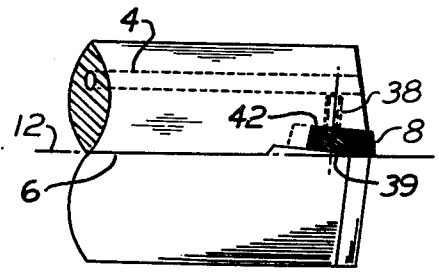
FIG. 3 is a side elevation of the outermost insert showing the positive axial rake.
Figure 5:
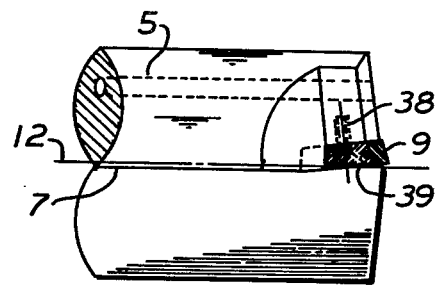
FIG. 5 is a side elevation of the innermost insert showing the negative axial rake.
Figure 4:
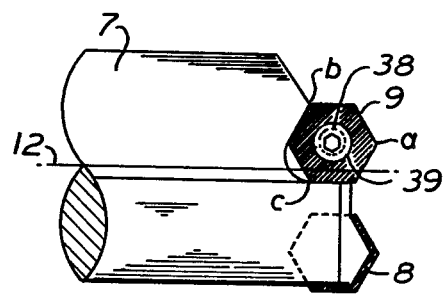
FIG. 4 is a view of the innermost insert showing the edge seats for locating the insert.

According to FIG. 1, the entire length of cutting edge 18 of insert 8, the edge which exerts the maximum cutting thrust, is active. All of the other cutting edges of the bits 8 and 9 have their cutting thrust effective length reduced by the amount of overlap. For example, the cutting edge 16 of bit 9 has an active cutting thrust from the tip or point a to the intersection 20 with the overlapping cut made by the cutting edge 15 of the bit 8. The cutting thrust exerted on the edge 18 is therefore greater than the cutting thrust exerted on edge 16 for two reasons: first, by reason of the radial distance of the cutting edge 18 from the axis 12 and second, by reason of the greater effective length of the cutting edge 18. This greater cutting thrust of the edge 18 could cause the drill to wander in deep cuts. In order to counterbalance the excess cutting thrust exerted by the cutting edge 18, the bit 8 is inclined at a positive axial rake angle as shown in FIG. 3 and the bit 9 is inclined at a negative axial rake angle as shown in FIG. 5.

FIG. 7 shows another expedient for counterbalancing the thrust exerted by the active cutting edges of the bits. In FIG. 7 the outermost bit 21 is made about half the size of the innermost bit 22. The thrust on the outer active cutting edge 23 of the bit 21, the edge on which the greatest cutting pressure is exerted, is counterbalanced by the thrust on outermost cutting edge 24 of the bit 22. The effective length of the edge 24 is the distance between the active cutting point 25 and the intersection 26 with the innermost active cutting edge 27 of the bit 21.

FIG. 8 shows another expedient for producing balanced cutting thrust on the drill. In this structure, there are three identical inserts: 28, 29 and 30. The outer cutting edge 31 of the bit 28 exerts a radially inward thrust on the cutter. This cutting thrust is balanced by the thrust exerted by the outer cutting edges 32 and 33 of the bits 29 and 30. While all of the edges 31, 32 and 33 are of the same length and the effective cutting length of the edges 32 and 33 is reduced by overlap, the net result is an effective balance in cutting thrust on the end of the drill.

In FIG. 9, the inserts 34 and 35 are deliberately made unsymmetrical. The outermost cutting edge 36 of the outer insert 34 is shorter than the outermost cutting edge 37 of the inner insert 35. The difference in length of the cutting edges 36 and 37 equalizes the radial cutting forces exerted by the cutting edges of the drill. The particular unsymmetrical shape of the inserts 34 and 35 made by cutting off the outer ends of the cutting points of a symmetrical hexagonal bit. The symmetrical hexagonal bit is shown in dotted lines for comparison purposes.

Each of the inserts is held in place by a screw 38 (FIG. 1) having an enlarged beveled head 39 which cams the insert toward edge seats 40, 41 and clamps the insert against bottom seat 42 (FIG. 3). The seats 40, 41, 42 define an insert receiving recess located on the trailing side of the flutes. Other expedients for clamping center hole inserts may be used.

I claim:

1. A drill having shank with chip removing flutes respectively on opposite sides of the forward end of the shank, indexable inserts mounted in one and the other of said flutes, each insert having a forwardly projecting cutting point in active cutting position, said cutting points being different radial distances from the axis of the shank and comprising a radially outermost cutting point having the greatest radial distance from the axis of the shank and a radially innermost cutting point having the least radial distance from the axis of the shank, each point having an inner active work engaging cutting edge inclined toward the axis of the shank and an outer active work engaging cutting edge inclined away from the axis of the shank, said edges diverging rearwardly from each point and generating inner and outer annular surfaces of revolution by rotation of the shank about its axis, the outer annular surface of revolution of the radially outermost cutting point having a maximum outside diameter equal to the outside diameter of the hole to be drilled, the inner annular surface of revolution of the radially innermost cutting point partially overlapping the axis of the shank, the other surfaces of revolution each partially overlapping a surface of revolution of the next adjacent insert, each insert being oriented so the non-overlapping portions of the inner and outer edges of its cutting point machines inner and outer sides of a different one of a plurality of radially spaced adjoining concentric grooves having sides corresponding to the non-overlapping portions of said inner and outer annular surfaces of revolution, the non-overlapping portions of the cutting edges which generate said outer annular surfaces each exerting a radial cutting thrust on the shank, and means for equalizing said radial cutting thrusts.

2. The drill of claim 1 in which said means comprises positioning the radially outermost cutting point so its outer active work engaging cutting edge is at a positive axial rake angle and positioning the radially innermost cutting point so its outer active work engaging cutting edge is at a negative axial rake angle.

3. The drill of claim 1 in which said means comprises increasing the length of the non-overlapping portion of the outer active cutting edge of the radially innermost cutting point.

4. The drill of claim 1 in which said means comprises in one of said flutes a single insert having said radially outermost cutting point and a plurality of said inserts in the other of said flutes.

5. The drill of claim 1 in which said means comprises using an insert having a shorter length of the non-overlapping portion of the outer active cutting edge of the radially outermost cutting point.

6. The drill of claim 3 in which the inserts are of similar shape with the outer active cutting edge of the radially outermost cutting point of lesser length than the outer active cutting edge of the radially innermost cutting point.

* * * * *